United States Patent [19]

May et al.

[11] 3,882,229

[45] May 6, 1975

[54] COMPOSITION AND METHOD FOR SHRINKING MUCOUS MEMBRANES

[75] Inventors: Hans-Joachim May, Moorrege/Holstein; Alex Berg, Eschershausen, both of Germany

[73] Assignee: Nordmark-Werke GmbH, Hamburg, Germany

[22] Filed: Nov. 8, 1973

[21] Appl. No.: 413,778

Related U.S. Application Data

[63] Continuation of Ser. No. 273,779, July 21, 1972, abandoned.

[52] U.S. Cl. .................................................. 424/273
[51] Int. Cl. ........................................... A61k 27/00
[58] Field of Search ...................................... 424/273

[56] References Cited

UNITED STATES PATENTS

| | | | |
|---|---|---|---|
| 3,287,469 | 11/1966 | Harvey | 260/309.6 |
| 3,288,805 | 11/1966 | Berg | 260/309.6 |
| 3,636,219 | 1/1972 | Culik et al. | 260/309.6 |

*Primary Examiner*—Stanley J. Friedman
*Attorney, Agent, or Firm*—McNenny, Farrington, Pearne & Gordon

[57] ABSTRACT

2-(Indanyl-4'-amino)-$\Delta^2$-imidazoline and its salts.

The present invention provides a new composition and method for shrinking mucous membranes utilizing as the active ingredient 2-(4-indanylamino-2-imidazoline or a pharmaceutically acceptable salt thereof.

3 Claims, No Drawings

COMPOSITION AND METHOD FOR SHRINKING MUCOUS MEMBRANES

RELATED APPLICATIONS

This application is a continuation of our copending application Ser. No. 273,779 filed July 21, 1972, now abandoned.

It is already known that certain 2-arylamino-2-imidazolines show certain pharmacological activities, Thus, U.S. Pat. No. 2 899 426 column 1 describes that 2-(1-naphthylamino)-2-imidazoline and its substituted derivatives may show either a blood pressure lowering or increasing effectiveness. It is furthermore known from Belgian Pat. No. 623 305 that the unsubstituted 2-(1-napthylamino)-2-imidazoline has a shrinking activity to the mucous membranes of the nose and vasoconstrictor activities.

The present invention refers to the new compound 2-(4-indanylamine)-2-imidazoline and its salts. This compound has the Formula I

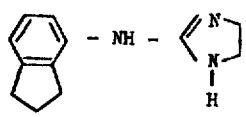

I.

The present invention furthermore refers to processes for the production therof. The compound of Formula I and its salts are new and are characterized by valuable pharmacological properties. Thus, the present invention also refers to pharmaceutical preparations comprising these compounds as active ingredient.

It is already known that certain 2-arylamino-2-imidazolines show certain pharmacological activities. Thus, US-Patent specification No. 2 899 426 column 1 describes that 2-(1-naphthylamino-2-imidazoline and its substituted derivatives may show either a blood pressure lowering or increasing effectiveness. It is furthermore known from Belgian Patent specification No. 623 305 that the unsubstituted 2-(1-naphthylamino)-2-imidazoline has a shrinking activity to the mucous membranes of the nose and vasoconstrictor activities.

From this group of 2-arylamino-2-imidazolines having a bicyclic aromatic groupment as aryl radical, only 2-(5', 6', 7', 8'-tetrahydro-naphthyl-1'-amino)-2-imidazoline is known as partially hydrogenated derivative from German Pat. No. 1 173 904, 1 191 381 and 1 195 323. This is the only member of the group of arylamino imidazolines which have been practically used as agent against the swelling of the mucous membranes (see Helwig, Moderne Arzneimittel, 3. Aufl., Wissenschaftliche Verlagsgesellschaft, Stuttgart 1967, page 914). As noted at Page 914, this member of the group of arylamino imidazolines is employed at a 0.117% (g/g) concentration in its hydrochloride acid salt form. This acid salt form concentration corresponds to a 0.10% (g/g) concentration of the base. The recommended dosage for adults and children of school age is three to four times per day spraying into each nasal opening.

It now has been found that the yet unknown 2-(4-indanylamino)-2-imidazoline of the above Formula I shows some surprisingly higher activities over the most effective member of the known derivatives of arylamino-2-imidazoline. The compound according to the present invention shows a considerably lower toxicity as the above known compound and vasoconstriction is generally obtained with one tenth of the dose necessary for the known compound, and this vasoconstriction is produced over three times the period of effectiveness of the known compound. Accordingly, the compound of the present invention has proven effective at reduced concentrations equal to about 0.01% (g/g) of the base or the equimolar amount of the pharmaceutically acceptable acid addition salt thereof as compared with the known compound. Of course, concentrations comparable with the indicated 0.10% by weight concentration of the base of the known compound result in commensurate increases in the effectiveness of the compound of the present invention as compared with the known compound. Furthermore, the undesired side effect on the blood pressure is very substantially decreased.

All of the pharmacological test results produced with the new compound 2-(4-indanylamino)-2-imidazoline according to the present invention are most valuable and surprisingly higher over all of the known arylamino imidazolines. The compound of the present invention and its salts therefore are indented to be used as vasoconstrictor agent, in particular as compound for decreasing the swelling of the mucous membranes. It can be used, for instance, by spraying an aqueous solution thereof onto the swollen mucous membrane.

2-(4-indanylamino)-2-imidazoline of the above Formula I as well as its salts are produced in accordance with the present invention by A. subjecting an indanyl-4-isothiuronium salt or the corresponding free base, an indanyl-4-thiourea, an indanyl-4-guanidine, an indanyl-4-nitroguanidine or an indanyl-4-cyanamide of Formula II

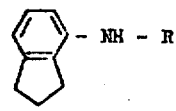

II.

wherein R is a member selected from the group of radicals of the following Formulas

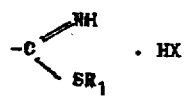 (a),

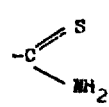 (b),

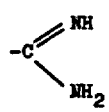 (c),

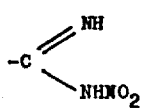 (d)

and   -CN   (e), $R_1$ is a lower alkyl group and X is the anion of an acid, preferably the anion of a hydrohalogenic acid (such as hydrochloric acid), to reaction with ethylenediamine or a monosalt thereof or B. subjecting an N-(4-indanyl)-N'-(β-aminoethyl)-urea of the general Formula III

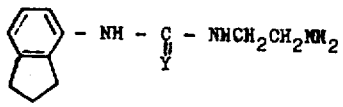

III.

wherein Y is an oxygen or sulfur atom, to a ring closure reaction or c. subjecting 4-amino-indane of Formula IV

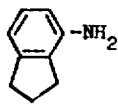

IV.

to reaction with a 2-alkylmercapto-2imidazoline of the general Formula V

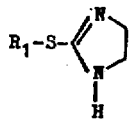

V.

wherein $R_1$ has the same meaning as in Formula II, preferably with a salt thereof, or D. subjecting 4-amino-indan of Formula IV to reaction with bis-(2-oxo-1-imidazolidinyl)-phosphine chloride of Formula VI

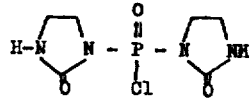

VI.

or

E. subjecting an indanyl-4-isocyanide dihalogenide of the general Formula VII

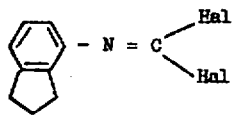

VII.

wherein Hal is a chlorine or bromine atom, to reaction with ethylenediamine or

F. partially hydrogenating 2-(4-indenylamino)-2-imidazoline of Formula VIII

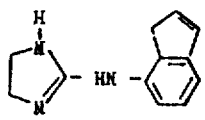

VIII.

Depending upon the method of production and the manner of separating the final products, the new imidazoline compound is obtained as a free base or as an acid addition salt thereof. The free base may be readily converted into a physiologically acceptable salt in usual manners by subjecting it to treatment with an appropriate acid. On the other hand, obtained acid addition salts may be converted into the free base in usual manners by subjecting the salt to reaction with an appropriate base stronger than the compound of Formula I.

The method (A) may be readily carried out by simply heating the isothiuronium salts of Formula IIa with ethylenediamine at a temperature between 80° and 200° C, for about one half to 3 hours. The reaction may also be carried out in the presence of an appropriate solvent at a temperature ranging between 60° to 140° C. Useful solvents are in particular those containing polar groupments such as water or the lower alcohols, for instance methanol, ethanol, n-propanol and isopropanol. However, the reaction mixture has to be heated for a longer period of time such as 5 to 20 hours when working in the presence of a solvent. Preferably, the reaction in the presence of a solvent is carried out under pressure. In both cases it is useful to add the ethylenediamine in an excess (110 – 150 %).

It is particularly advantageous to react the free isothiuronium base IIa with a mono-salt of ethylenediamine, preferably with an excess thereof, at a temperature between 80° and 200° C., preferably 110° to 150° C., and possibly in the presence of an inert organic solvent such as a higher alcohol having 3 to 8 carbon atoms or a mixture of several such alcohols, ethylene glycol monoalkyl ethers having lower alkyl groups, nitrobenzene or the like. The reaction may start from any of the sufficiently stable mono-salts of ethylenediamine such is the mono-p-toluene sulfonate or the mono-hydroiodide.

Particularly preferred is the reaction of the 4-indanyl-S-alkyl-isothiourea IIa as a free base with a mono-salt of ethylenediamine in excess, preferably 3 to 3 mols of the mono-salt of ethylenediamine per each mol of 4-indanyl-S-alkyl-isothiourea, in the presence of a solvent, preferably a higher alcohol having from 4 to 7 carbon atoms, a mixture of several of such alchols or of ethylene glycol monoalkyl ethers having from 1 to 4 carbon atoms in the alkyl group. The reaction is carried out by heating the mixture for several hours at a temperature at 80° to 200° C., preferably with stirring for 3 to 5 hours at 110° to 150° C. This embodiment allows the production of compound I according to the present invention in a particularly pure form and in a high yield; it further allows a simple separation of by products.

The isothiuronium salts of Formula IIa are produced in manners known per se by heating of the corresponding thiourea of Formula IIb with a lower alkyl halogenide or with a dialkyl sulfate in a solvent, such as a lower alcohol. The thioureas may be produced also by methods known per se from 4-amino indane (see Houben-Weyl, Vol. 9, p. 837 ff.).

Instead of starting with an isothiuronium salt, it is also possible to directly heat the thioureas of Formula IIb together with ethylenediamine at a temperature between 100° and 200° C., preferably in a vacuum. It is again preferred to use ethylenediamine in excess.

Furthermore, the compound according to Formula 1 may be obtained by subjecting ehtylenediamine or a mono-salt thereof to reaction with indanyl-4-guanidine of Formula IIc or a salt thereof with an inorganic or organic acid. The reaction may be carried out in the presence or absence of a solvent. The necessary temperatures to be applied range between 100° and 200° C., preferably between 130° and 150° C. Higher alcohols or nitrobenzene or the like may be used as solvents. Examples for inorganic salts of indanyl-4-guanidine of Formula IIc are the hydrochloride, hydrobromide, hydroiodide, sulfate and nitrate; organic salts which may be used are for instance the benzene or toluene sulfonates.

Furthermore, the reaction may be started with the corresponding nitroguanidine of Formula IId instead of indanyl-4-guanidine. The compound of Formula IId is heated with ethylenediamine in an appropriate solvent such as ethanol, propanol, butanol or amyl alcohol. Indanyl-4-nitroguanidine may be produced by subjecting 4-amino indane to reaction with N-methyl-N-nitroso-N'-nitro guanidine (see Journal of the American Chemical Society, Vol. 69 (1947) p. 3028).

The reaction of indanyl-4-cyanamide of the Formula IIe with ethylenediamine or a mono-salt thereof is preferably carried out at a temperature between 50° and 200° C., in particular 100° to 150° C., in the presence or absence of an appropriate solvent. It is preferred to use ethylenediamine or the salt thereof in excess and to select such a solvent that the reaction mixture is homogeneous. Useful solvents are for instance higher alcohols such as butanol, amyl alcohol or hexanol; useful salts of ethylenediamine are for instancne the mono-hydroiodide and the mono-p-toluene sulfonate. Indanyl-4-cyanamide of Formula IIe may be produced from the corresponding indanyl-4-thiourea and copper sulfate in an alkaline solution.

N'-(4'-indanyl)-N'-(aminoethyl)-thiourea of Formula III or the corresponding urea, which are the starting products of method (B), is produced by subjecting indanyl-4-isocyanate or the corresponding isothiocyanate to reaction with ethylenediamine in accordance with Journal of Organic Chemistry, Vol. 24, (1959) p. 818. The ring closure is effected by heating the compound to a temperature between 130° and 200° C., in the presence or absence of an appropriate solvent, preferably in an inert gas such as nitrogen.

The reaction of 4-amino indane of Formula IV with an alkyl mercapto-2-imidazoline of the general Formula V according to method (C) of the process of the present invention may also be carried out in the presence or absence of an appropriate solvent. However, a sufficiently high temperature has to be used in order to remove the alkylmercaptane from the reaction mixture. In general, a temperature between 60° to 200° C. is appropriate. Higher boiling ethers, alcohols such as methanol, ethanol or propanol, saturated cyclic hydrocarbons such as cyclohexane and methyl cyclohexane, aromatic hydrocarbons such as benzene, toluene, xylene, and chlorinated hydrocarbons such as chloro- or dichlorobenzene may be used as solvents.

The 2-alkylmercapto-2-imidazoline of the general Formula V which may be used as salts such as the hydroiodide, may be produced in manners known per se by alkylation of the corresponding alkylene thiourea in accordance with Organic Synthesis, Vol. III, p. 394.

Another embodiment of the process of the present invention for producing the compound of Formula I is method D) according to which bis-(2-oxo-imidazolindinyl)-phosphine chloride of Formula VI is heated with 4amino indane of Formula IV in an inert organic solvent such as xylene or mesitylene, at a temperature between about 100° and 180° C. The starting product according to Formula VI may be produced in manners known per se by reacting imidazolidone-2 with phosphorous pentachloride in chloroform at a temperature between 20° and 40° C. (see Bull.Soc. Chim. France, 1961, p. 2114).

Furthermore, indanyl-4-isocyanide dihalogenide of the general Formula VII may be used as starting material. The reaction thereof with ethylenediamine according to method (E) of the process of the present invention is preferably carried out in an organic solvent at a temperature between 0° C. and the boiling point of the solvent. Useful solvents are for instance dioxane, the alcohols such as methanol, ethanol, propanol or butanol, the ketones, the aromatic hydrocarbons such as benzene, toluene or xylene and the halogenated aliphatic or aromatic hydrocarbons. This reaction yields into 2 mols of hydrohalogenide acid per each mol of isocyanide dihalogenide which may be bound either by an appropriate excess of ethylenediamine or by an appropriate amount of potassium or sodium carbonate or of a tertiary amine such as trimethylamine, triethylamine, tributylamine or N,N-dimethylcyclohexylamine.

Another embodiment (F) of the process according to the present invention consist in a partial hydrogenation of 2-(indenyl-4'-amino)-2-imidazoline and preferably a hydrohalogenide thereof, with hydrogen in the presence of a known catalyst for hydrogenation at an elevated pressure and at an elevated temperature. Raney-Nickel is a preferred catalyst. The hydrogenation preferably is carried out at a pressure of 50 to 150 atmospheres and at a temperature above 80° C., preferably in the presence of polar solvent such as a lower aliphatic alcohol such as methanol, ethanol, n-propanol, isopropanol and the like. The partial hydrogenation may however also be effected in the absence of a catalyst by hydrogen produced in situ, preferably with sodium amalgan (a mixture of metallic sodium and mercury) in the presence of such a polar solvent and preferably in the presence of an organic acid such as acetic acid. This reaction is preferably carried out at room temperature and at normal pressure.

Depending upon the method of the process according to the present invention applied, the final product is obtained as a free base or as a salt thereof. The free base may be converted into any desired salt by treatment with the appropriate acid in manners known per se. Useful acids are the hydrogalogenic acids, nitric acid, sulfuric acid, orthophosphoric acid, the alkane carboxylic acids such as acetic acid or propionic acid, polyvalent acids such as oxalic acid, tartaric acid, succinic acid, maleic acid, hydroxysuccinic acid, ascorbic acid or citric acid, the sulphonic acids such as methane sulphonic acid, ethane sulphonic acid, benezene sulphone acid or p-toluene sulphonic acid, as well as the aromatic carboxylic acids such as benzoic acid, salicylic acid or p-amino-salicylic acid.

The new imidazoline according to Formula I and the salts thereof may be converted into appropriate pharmaceutical preparations using usual additives.

The following examples further illustrate the preparation of the new imidazoline according to Formula I and the salts thereof.

EXAMPLE 1 a. N-4-Indanyl thiourea

A solution of benzoyl isothiocyanate prepared from 0.2 mol of ammonium thiocyanate and 0.2 mol of benzoyl chloride according to Houben-Weyl, Methoden der organischen Chemie, Vol. 9, p. 879, is added slowly and with stirring to a hot solution of 26.6 g.(0.2 mol) of 4-amino indane in 50 cc. of acetone. Heating is continued for 30 minutes after the addition is finished. The mixture then is allowed to cool and is poured into 300 cc. of ice water. The precipitated N-4-indanyl-N°-benzoyl thiourea (mp. 161° to 163° C.) which is obtained practically in a theoretical yield, is filtered off with suction and thereafter added to 200 cc. of 10 % soda lye and refluxed with stirring for 5 minutes in order to split off the benzoyl group. The resulting solution is cooled whereafter the pH thereof is brought to pH 5 by adding concentrated hydrochloric acid and thereafter is rendered weakly alkaline by the addition of aqueous ammonia. The precipitated N-4-indanyl thiourea is filtered off with suction and washed with water. It is recrystallized from methanol with the addition of 10 % of activated carbon. Thus, 32.2 g. of N-4-indanyl thiourea (84 % of the theoretical) is obtained having a mp. of 178 to 180° C.

b. N-4-Indanyl-S-methyl-isothiuronium hydroiodide 38.5 g. (0.1 mol) of N-4-indanyl thiourea are dissolved in 250 cc. of methanol. 42.6 g. (0.3 mol) of methyl iodide are added thereto and the mixture is refluxed for 2½ hours. The mixture thereafter is cooled and the solvent is removed in a rotation evaporator in a vacuum. Thus, 57.5 g. of N-4-indanyl-S-methyl-isothiuronium hydroiodide (86 % of theoretical) are obtained. M.p. 144° to 146° C.

c. 2-(4-indanylamino)-2-imidazoline 33.4 g. (0.1 mol) of N-4-indanyl-S-methyl-isothiuronium hydroiodide are mixed with 9.0 g. (0.15 mol) of anhydrous ethylenediamine. The mixture is slowly heated to 80° C. and heating in continued until the termination of the formation of methylmercaptane (about 4 hours). After cooling the residue is dissolved in 2 N hydrochloric acid and the solution is extracted with chloroform. The extract is discarded and the aqueous phase is rendered alkaline by the addition of 10 % soda lye. The resulting solution is extracted with chloroform and the extract is washed with water, dried over anhydrous sodium sulphate and the solvent is removed. An oily residue is obtained which upon standing soon crystallizes. The product is recrystallized from petroleum ether having a boiling range of 100° to 140° C. in the presence of activated carbon. Thus, 11.1 g. of 2-(4-indanylamino)-2-imidazoline (55 % of theoretical) are obtained as the free base. M.p. 109° to 113° C.

EXAMPLE 2 a. N-4-Indanyl-S-methyl-isothiurea 334.2 g. (1 mol) of N-4-indanyl-S-methyl-isothiuronium hydroiodide produced in accordance with Example 1b are shaken with 1 liter of a cooled saturated aqueous solution of sodium carbonate. 1 liter of ether is added thereto and shaking is continued until the separated oil is completely dissolved. The aqueous phase is again extracted with ether and the combined ethereal extracts are washed with water until neutral reaction and thereafter are dried over anhydrous sodium sulphate. The ether is distilled off without heating. Thus, 183.0 g. of N-4-indanyl-S-methyl-isothiourea (88 % of theoretical) are obtained. M.p. 51° to 52° C.

b. 2-(4-indanylamino)-2-imidazoline hydrochloride 155 g. (0.75 mol) of N-4-indanyl-S-methyl-isothiourea are dissolved in 400 cc. of ethylene glycol monoethyl ether and this solution is added to a warm solution of 398 g. (1.5 mol) of ethylenediamine mono-p-toluene sulphonate in 800 cc. of ethylene glycol monoethyl ether. The mixture then is heated with stirring for 5 hours to 130° to 135° C. After cooling, half of the solvent is separated in a rotation evaporator in a vacuum and the resulting product is allowed to stand over night. The precipitated ethylenediamine di-p-toluene sulphonate is filtered off with suction and the remaining solvent is separated from the filtrate. The oily residue is mixed with 500 cc. of 50 % aqueous hydrochloric acid, is heated to boiling for a short period of time and thereafter is evaporated to dryness in a rotation evaporator in a vacumm. The residue is three times treated with 100 cc. of benzene. The benzene is again distilled off and the residue is recrystallized from isopropanol. Thus, 135.5 g. of 2-(4-indanylamino)-2-imidazoline hydrochloride (76 % of theoretical) are obtained. M.p 183° to 185° C. This salt may be readily converted into the free base by reaction with a strong base. Thus, 104 g. of 2-(4-indanylamino)-$\Delta^2$-imidazoline (69 % of theoretical) are obtained. M.p. 114° to 116° C.

EXAMPLE 3

2-(4-indanylamino)-2-imidazoline sulphate 19.2 g. (0.1 mol) of 4-indanyl thiourea and 12.0 g. (0.2 mol) of anhydrous ethylenediamine are slowly heated with stirring to 140° C. Heating is continued for another hour at 130° to 135° C. after the formation of hydrogen sulphide started. The reaction mixture then is cooled in a rotation evaporator in a vacuum in order to separate all volatile components. The residue is rendered neutral by the addition of 1 N hydrochloric acid and the resulting product is extracted with chloroform. The extract is discarded and the aqueous phase rendered to a pH 12 by the addition of 10 % aqueous soda lye. This solution again is extracted with chloroform. The extract is washed with water, dried over anhydrous sodium sulphate and is evaporated. The residue is dissolved in anhydrous ethanol, concentrated sulphuric acid is added dropwise until neutral reaction and the alcohol is evaporated. The resulting product is recrystallized from isopropanol. Thus, 7.3 g. of 2-(4-indanylamino)-2-imidazoline sulphate (29 % of theoretical) are obtained. M.p. 204° to 205° C.

EXAMPLE 4 a. 4-Indanyl-isothiocyanate 39.9 g. (0.3 mol) of 4-amino indane are dissolved in 100 cc. of 1.2-dichloroethane. A mixture of 45.0 g. (0.39 mol) of thiophosgene, 100 cc. of 1.2-dichloroethane and 200 cc. of water are added thereto dropwise with stirring within a period of two hours. The temperature of the reaction mixture is kept at 18° to 20° C. by cooling. After the addition is finished, stirring is continued at room temperature for four hours. The aqueous phase of the reaction mixture is separated and extracted with 100 cc. of 1.2 -dichloroethane. The combined organic solutions are washed several times with a total amount of 1 liter of water and dried over anhydrous sodium sulphate. The solvent is separated in a vacuum and the residue is distilled. Thus, 47.3 g. of 4-indanyl-isothiocyanate (90 % of the theoretical) are obtained. B.p.$_{0.04\ mm}$: 84° C.; $n_D^{20}$ = 1.6486.

b. N-(4-Indanyl-N'-(β-aminoethyl)-thiourea

A solution of 17.5 g. (0.1 mol) of 4-indanyl-isothiocyanate in 25 cc. of benzene is added dropwise to a solution of 6.0 g. of anhydrous ethylenediamine in 150 cc. of benzene with stirring at room temperature within a period of 40 minutes. Stirring is continued for 6 hours. Thereafter, 400 cc. of water and 9 cc. of concentrated hydrochloric acid are added thereto and the reaction mixture is evaporated to dryness in a rotation evaporator in a vacuum. The residue is mixed with 150 cc. of water, the mixture is heated to 50° C. and the insolubles are filtered off with suction and discarded. The filtrate is cooled and rendered alkaline by the adition of 10 % aqueous soda lye. The precipitate is filtered off with suction and is recrystallized from a small amount of methanol with the addition of activated carbon. Thus, 9.2 g. of N-(4-indanyl)-N'-(β-aminoethyl)-thiourea (39 % of the theoretical) are obtained. M.p. 161° to 163° C.

c. 2-(4-indanylamino)-2-imidazoline 5.9 g. (0.025 mol) of N-(4-indanyl)-N'-(β-aminoethyl) thiourea are heated slowly in an oil bath under an atmosphere of nitrogen to 140° C. and heating is continued for another 1 ½ hours. Thereafter, the formation of hydrogen sulphide is terminated and the reaction product is cooled. Thereafter it is rendered acid by the addition of 1 N hydrochloric acid. Unsolubles are filtered off and the filtrate is rendered alkaline by the addition of 10 % aqueous soda lye. This solution is extracted with chloroform, the extract is washed with water and dried over anhydrous sodium sulphate and is evaporated. The residue is recrystallized from petroleum ether (boiling range 100° to 140° C.) with the addition of activated carbon. Thus, 3.3 g. of 2-(4-indanylamino)-2-imidazolinr (65 % of the theoretical) are obtained as the free base. M.p. 110° to 113° C.

EXAMPLE 5

2-(4-indanylamino)-2-imidazoline hydroiodide 6.6 g. (0.05 mol) of 4-amino indane and 9.3 g. (0.038 mol) of 2-methylmercapto-2-imidazoline hydroiodide are slowly heated to 140° C. in an atmosphere of nitrogen. Heating at 100° C. is continued for another hour after the formation of methylmercaptane has started. The reaction product is cooled and thereafter triturated with acetone. The colourless precipitate is filtered off with suction. Thus, 5.5 g of 2-(4-indanylamino)-2-imidazoline hydroiodide (45 % of the theoretical) are obtained. M.p. 121° to 123° C.

Upon reaction with a strong base, 2.7 g. of the free base 2(4-indanylamino)-2-imidazoline are obtained. M.p. 110° to 112° C.

EXAMPLE 6 a. N-(4-Indanyl)-formamide 39.9 g. (0.3 mol) of 4-amino indane and 100 cc. of 98 to 100 % formic acid are refluxed for 5 hours with the exclusion of moisture. After cooling the reaction mixture is added with stirring to 1,000 cc. of a mixture of ice and water. The crystalline precipitate is filtered off with suction, dried and recrystallized from petrol ether (boiling range 100° to 140° C.). Thus, 35.8 g. of N-(4-indanyl)-formamide (74 % of the theoretical) are obtained. M.p. 103° to 104° C.

b. 4-Indanyl-isocyanide dichloride 11.3 g. (0.07 mol) of N-(4-indanyl)-formamide are added in fractions with stirring to a mixture of 6.2 cc. (0.077 mol) of sulphuryl chloride and 23 cc. of thionylchloride while keeping the reaction mixture at 15° to 20° C. Stirring is continued for 2 at room temperature, 1 hour at 40° C. and 3 hours at 70° C. Upon cooling, the reaction mixture is evaporated in a rotation evaporator and the residue is extracted 3 times with anhydrous benzene. The solvent is separated. Thus, 14.2 g. of raw 4-indanyl-isocyanide dichloride (98.6 % of the theoretical) are obtained which are used in the further reaction without additional purification.

c. 2-(4-indanylamino)-2-imidazoline 3.2 g. (0.015 mol) of 4-indanyl-isocyanide dichloride are dissolved in 20 cc. of anhydrous ethanol. The solution is cooled to 0° C. A solution of 1.0 cc. (0.015 mol) of anhydrous ethylenediamine in 10 cc. of anhydrous ethanol is added dropwise thereto with continuous cooling. After the addition is terminated, the reaction mixture is allowed to warm up to room temperature and stirring is continued over night. Thereafter, the solvent is distilled off. The residue is suspended in water, the suspension is rendered alkaline with 10 % aqueous soda lye and thereafter is extracted 3 times with chloroform. The combined chloroform extracts are washed with water until neutral reaction, dried over anhydrous sodium sulphate and evaporated in a rotation evaporator. The residue is recrystallized from petrol ether (boiling range 110° to 140° C.) with the addition of activated carbon. Thus, 0.8 g. of 2-(4-indanylamino)-2-imidazoline (26.5 % of the theoretical) are obtained. M.p. 109° to 112° C.

EXAMPLE 7 a. 4-Indanyl-isocyanide dichloride

Dry chlorine gas is bubbled into a solution of 17.5 g. (0.1 mol) of 4-indanyl-isothiocyanate (obtained according to Example 4a) in 230 cc. of anhydrous carbontetrachloride with stirring at 5° to 15° C. until the weight of the reaction mixture is increased for 14.2 g. (0.4 mol Cl$_2$). Thereafter, the reaction mixture is allowed to stand over night and the solvent is evaporated in a vacuum in a rotation evaporator. Thus, 19 g. of raw 4-indanyl-isocyanide dichloride (88.7 % of the theoretical) are obtained as residue. This product is further reacted without purification.

b. 2-(4-indanylamino)-2-imidazoline 6 g. (0.028 mol) of 4-indanyl-isocyanide dichloride are dissolved in 40 cc. of anhydrous alcohol and are reacted with 1.88 cc. (0.028 mol) of anhydrous ethylenediamine in 20 cc. of anhydrous ethanol as described in Example 6c and the resulting reaction mixture worked up as there described. Thus, 1.9 g. of 2-(4-indanylamino)-2-imidazoline (33.7 % of the theoretical) are obtained. M.p. 109° to 112° C.

EXAMPLE 8 a. 2-(4-indanylamino)-2-imidazoline nitrate 20.1 g. (0.1 mol) of 2-(4-indanylamino)-2-imidazoline prepared according to any of Examples 1 to 5, are suspended in 100 cc. of water. 15 % aqueous nitric acid is added thereto dropwise until a steady neutral reaction. The reaction mixture is heated to boiling for a short period of time until the compound is completely dissolved, 5 g. of activated carbon and 5 g. of alumina are added and the solution is filtered while hot. Upon cooling 24.8 g. of 2-(4-indanylamino)-2-imidazoline-nitrate (94 % of the theoretical) separate by crystallisation. M.p. 142° to 143° C.

When using ethanol as solvent and equimolar amounts of the corresponding acids the following salts of 2-(4-indanylamino)-2-imidazoline have been prepared:

| | | |
|---|---|---|
| Tatrate | M.p. 209 – 210° C. | (from isopropanol) |
| Succinate | M.p. 188 – 191° C. | (from isopropanol) |
| Maleinate | M.p. 122 – 124° C. | (from isopropanol) |
| Citrate | M.p. 86 – 88° C. | (decomp.) (from isopropanol/ether) |
| Maleate | M.p. 182 – 184° C. | (from isopropanol/ether) |
| Mesylate | M.p. 151 – 152° C. | (from isopropanol) |
| Tosylate | M.p. 119 – 121° C. | (from isopropanol/ether). |

What we claim is:

1. The method of reducing the swelling of human mucous membrane which comprises contacting the mucous membrane with an aqueous solution containing an effective amount of 2-(4-indanylamino)-2-imidazoline or a pharmaceutically acceptable acid addition salt thereof.

2. The method of claim 1 wherein the concentration of said 2-(4-indanylamino)-2-imidazoline or a pharmaceutically acceptable acid addition salt thereof in said aqueous solution is greater than about 0.01% of the 2-(4-indanylamino)-2-imidazoline base by weight or the equimolar amount of the pharmaceutically acceptable acid addition salt thereof.

3. The method of claim 1 wherein the concentration of said 2-(4-indanylamino)-2-imidazoline or a pharmaceutically acceptable acid addition salt thereof in said aqueous solution is in the range of from about 0.01% to about 0.10% of the 2-(4-indanylamino)-2-imidazoline base by weight or the equimolar amount of the pharmaceutically acceptable acid addition salt thereof.

* * * * *